(12) United States Patent
Lo et al.

(10) Patent No.: US 9,172,885 B2
(45) Date of Patent: Oct. 27, 2015

(54) CAMERA ANGLE ADJUSTABLE DEVICE AND THE METHOD OF HANDLING THE ARTICLE

(71) Applicant: VI-TAI TECHNOLOGY CO., LTD., New Taipei (TW)

(72) Inventors: Chi-Wu Lo, Hsinchu County (TW); Chao-Hsi Wang, Hsinchu County (TW); Kao-Chi Liu, Taipei (TW)

(73) Assignee: VI-TAI TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 14/485,600

(22) Filed: Sep. 12, 2014

(65) Prior Publication Data

US 2015/0077623 A1    Mar. 19, 2015

(30) Foreign Application Priority Data

Sep. 18, 2013    (TW) .............................. 102133841 A (51) Int. Cl.

| G03B 41/00 | (2006.01) |
|---|---|
| H04N 5/232 | (2006.01) |
| G02B 7/182 | (2006.01) |
| H04N 5/225 | (2006.01) |
| G03B 5/00 | (2006.01) |
| G03B 15/12 | (2006.01) |
| G02B 26/08 | (2006.01) |

(52) U.S. Cl.
CPC .......... *H04N 5/23296* (2013.01); *G02B 7/1821* (2013.01); *G03B 5/00* (2013.01); *G03B 15/12* (2013.01); *H04N 5/2254* (2013.01); *G02B 26/0816* (2013.01)

(58) Field of Classification Search
USPC .......................................................... 396/323
See application file for complete search history.

(56) References Cited

U.S. PATENT DOCUMENTS

| 6,992,699 B1* | 1/2006 | Vance et al. ............. 348/207.99 |
|---|---|---|
| 2009/0002797 A1* | 1/2009 | Kwong et al. ................. 359/225 |
| 2012/0257884 A1* | 10/2012 | Seita .............................. 396/358 |
| 2012/0273656 A1* | 11/2012 | Asai ........................... 250/208.1 |
| 2014/0055624 A1* | 2/2014 | Gaines et al. .............. 348/207.1 |

* cited by examiner

*Primary Examiner* — Clayton E LaBalle
*Assistant Examiner* — Dennis Hancock
(74) *Attorney, Agent, or Firm* — Li & Cai Intellectual Property (USA) Office (57) ABSTRACT

The instant disclosure relates to a camera angle adjustable device. The camera angle adjustable device includes a base, a camera module, a reflective mirror structure and a driver. The base has a first surface, a second surface, a front side and a back side. The camera module is disposed on one side perpendicular to the front side and the back side of the first surface. The reflective mirror structure includes a frame and a mirror body, wherein the frame is pivotally connected to the first surface, the mirror body is mounted on the frame, and the mirror body selectively corresponds to one of the front side and the back side. The driver is mounted on the second surface and connected to the reflective mirror structure in order to drive the reflective mirror structure. A method for adjustable the camera angle is also provided.

8 Claims, 9 Drawing Sheets

CAMERA ANGLE ADJUSTABLE DEVICE AND THE METHOD OF HANDLING THE ARTICLE

BACKGROUND OF THE INVENTION

1. Field of the Invention

The instant disclosure relates to a camera angle adjustable device and a method for adjusting a camera angle; in particular, to a camera angle adjustable device and a method for adjusting a camera angle for a portable electronic device.

2. Description of Related Art

As modern science and technology develops, the demand for photographic capabilities in portable electronic devices, such as tablet computers and mobile phones, significantly increases. Moreover, front facing and rear facing photographic shooting has been further developed, such that users can shoot in front of or behind the electronic device.

Conventional portable electronic device may include a two-directional system which uses two different lens modules to provide the forward and rearward shooting. Users can switch between the two lens modules via software control to achieve two-directional shooting.

Although the conventional technique allows users to shoot in two directions, since two independent lens modules and power supply systems are required, production costs increase, the volume occupied by the electronic devices increase, and the complexity of the circuit design directly or indirectly increase. In addition, forward and rearward photographic modules typically display different resolutions in which one resolution typically suffers. In general, the resolution of the rearward photographic module is much poorer than the forward photographic module, thus, the image quality in many photographic modules on portable electronic devices for capturing an image with a self-timer, is generally poor.

To address the above issues, the inventor strives via associated experience and research to present the instant disclosure, which can effectively improve the limitation described above.

SUMMARY OF THE INVENTION

The objective of the instant disclosure is to provide a camera angle adjustable device and a method for adjusting a camera angle to minimize the additional camera module and the number of power supplies in the conventional two-directional camera in the portable electronic devices in order to reduce space and costs, as well as simplifying circuit design. In order to achieve the aforementioned objectives, according to an embodiment of the instant disclosure, a camera angle adjustable device is provided, the camera angle adjustable device comprising a base, a camera module, a reflective mirror structure, and a driver. The base has a first surface, a second surface, a front side and a back side. The camera module is disposed on a side of the first surface normal to the front side and the back side. The reflective mirror structure includes a frame and at least one mirror body. The frame is pivotally disposed on the first surface. The at least one mirror body is arranged in the frame. The at least one mirror body selectively corresponds to the front side or the back side by rotating the frame. The driver is disposed on the second surface, and the driver is engaged to the frame to drive rotations of the reflective mirror structure.

Preferably, two mirror bodies are installed on the frame with an angle therebetween.

In another embodiment of the instant disclosure, a method to adjust camera angle is provided to adjust a camera angle of a portable electronic device. The portable electronic device has a forward photographic window and a rearward photographic window. The method comprising the steps of: providing a camera angle adjustable device, in which the camera angle adjustable device engages with a portable electronic device, a front side of a base of the camera angle adjustable device corresponds to the forward photographic window and a back side of a base of the camera angle adjustable device corresponds to a rearward photographic window; rotating a driver to correspond a reflective mirror structure to the forward photographic window such that the reflective mirror structure reflects light received by the forward photographic window to a camera module; and rotating a driver to correspond a reflective mirror structure to the rearward photographic window such that the reflective mirror structure reflects light received by the rearward photographic window to a camera module of the camera angle adjustable device.

In summary, a single lens camera module can capture images or video in front or behind the camera angle adjustable device in the first embodiment, without having to provide different camera modules and power supplies. The camera angle adjustable device of the present disclosure reduces production costs and space, simplifies circuit and image processing software designs, and does not need to calibrate image quality of two camera modules having different resolutions, thus providing identical high resolution imaging quality in front of or behind the camera modules.

In the second embodiment, the frame of the reflective mirror structure has two mirror bodies arranged with an angle therebetween. The two mirror bodies can be separately arranged to face either the forward or rearward photographic windows, such that only a slight angle adjustment of the reflective mirror structure is required when adjusting the photographic windows. As a result, the camera angle adjustable device of the second embodiment can provide the same effects with a relatively smaller overall volume and thinner with respect to the camera angle adjustable device of the first embodiment. Moreover, the structure design of camera angle adjustable device is also simplified.

In order to further understand the instant disclosure, the following embodiments and illustrations are provided. However, the detailed description and drawings are merely illustrative of the disclosure, rather than limiting the scope being defined by the appended claims and equivalents thereof.

DETAILED DESCRIPTION OF THE PREFERRED EMBODIMENTS

The aforementioned illustrations and detailed descriptions are exemplarities for the purpose of further explaining the scope of the instant disclosure. Other objectives and advantages related to the instant disclosure will be illustrated in the subsequent descriptions and appended drawings.

First Embodiment

Figure 1:
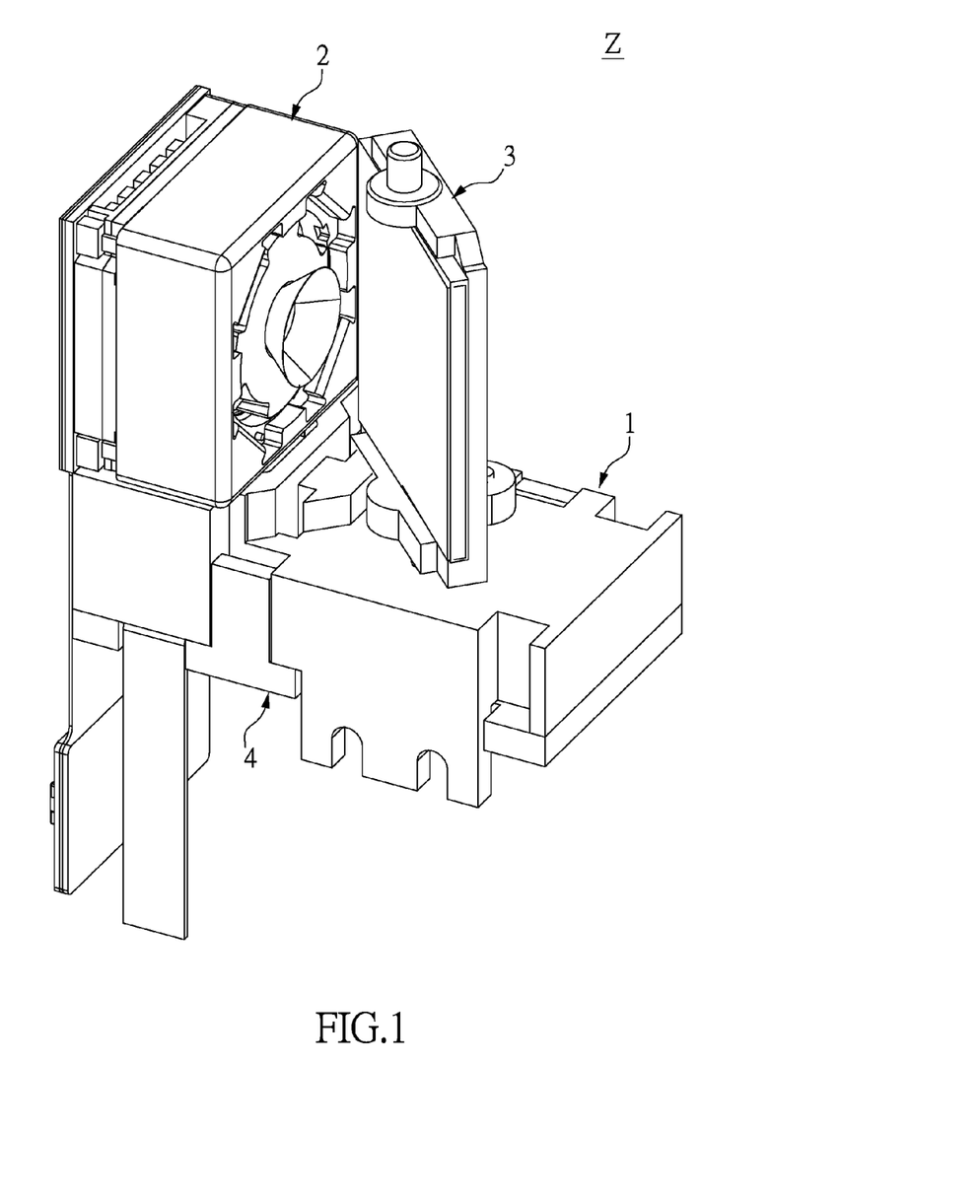
FIG. 1 is an assembled view of a camera angle adjustable device in accordance with a first embodiment of the instant disclosure.
Figure 2:
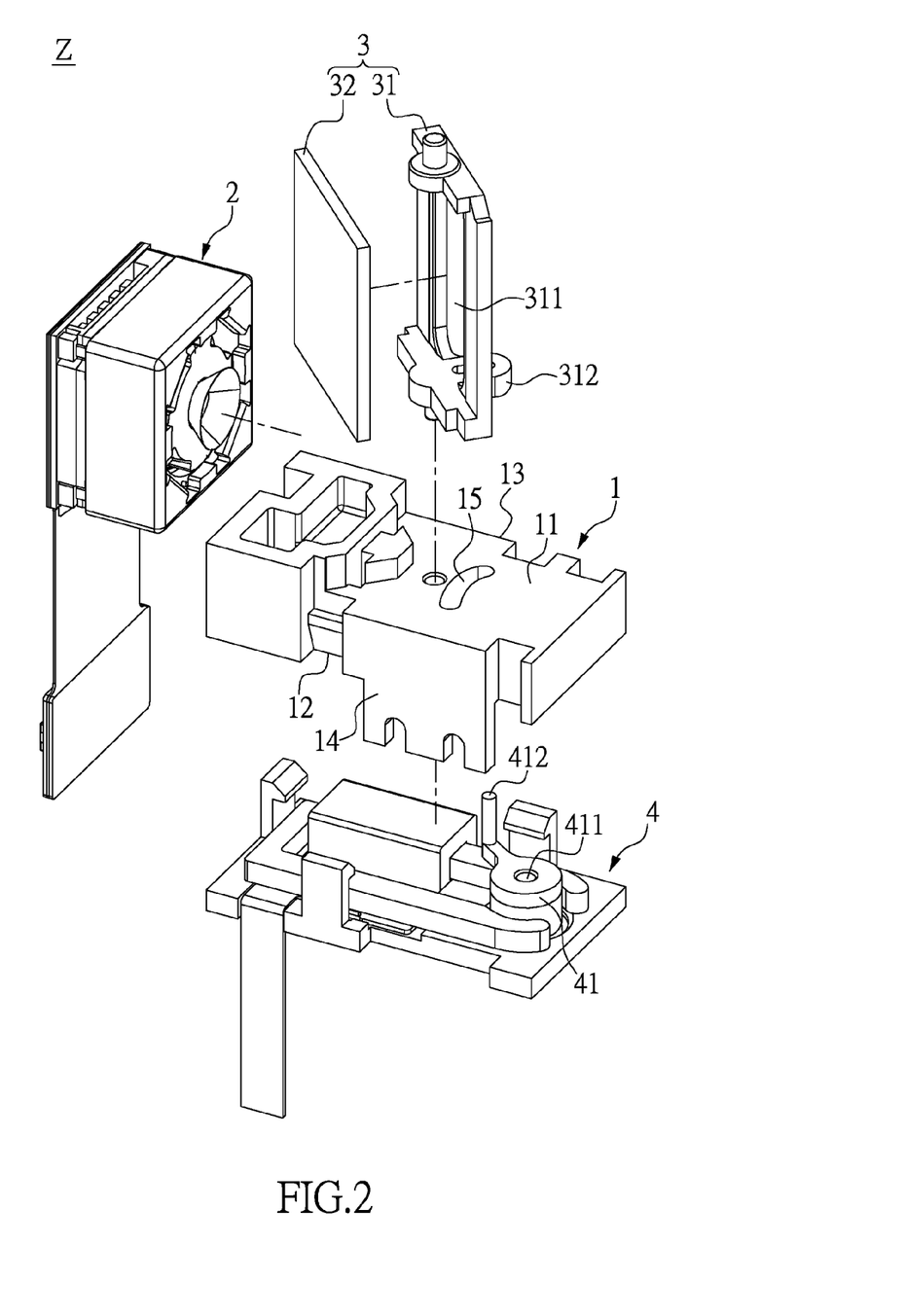
FIG. 2 is an exploded view of the camera angle adjustable device in accordance with the first embodiment of the instant disclosure.

Please refer to FIGS. 1 and 2, in which FIG. 1 is an assembled view and FIG. 2 is an exploded view of a camera angle adjustable device in accordance with a first embodiment of the instant disclosure. The instant disclosure provides a camera angle adjustable device Z, which includes a base 1, a camera module 2, a reflective mirror structure 3, and a drive 4. The camera module 2 and the reflective mirror structure 3 are disposed on a side of the base 1, whereas the driver 4 is disposed on another side of the base 1 and connected to the reflective mirror structure 3 in order to rotate the reflective mirror structure 3. Further structural characteristics and configurations between each element are disclosed below.

Figure 3:
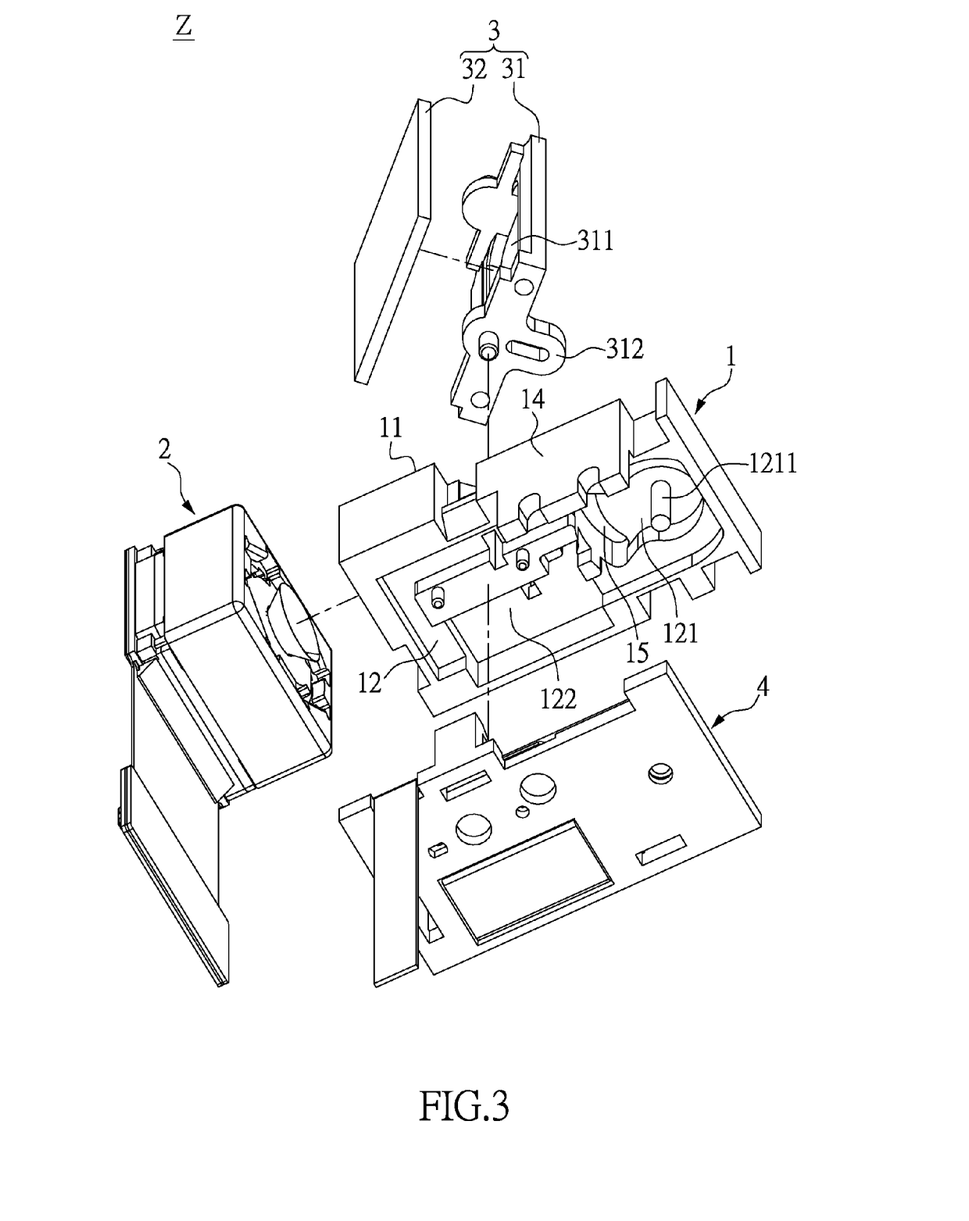
FIG. 3 is another exploded view of the camera angle adjustable device in accordance with the first embodiment of the instant disclosure.

Please refer to FIGS. 2 to 4A, in which FIG. 3 is another exploded view of the camera angle adjustable device in accordance with the first embodiment of the instant disclosure. The base 1 has a first surface 11, a second surface 12, a front end 13, and a back end 14. The base 1 is engaged to and installed to inner portions of a portable electronic device E. The portable electronic device E has a forward photographic window E1 and a rearward photographic window E2. The front end 13 of the base 1 corresponds to the forward photographic window E1, whereas the back end 14 of the base 1 corresponds to the rearward photographic window E2. The first surface 11 of the base 1 faces upwards in the instant embodiment as shown in figures, however, it is not limited hereto.

Specifically, the base 1 has an arc-shaped limiting slot 15 penetrating through the first surface 11 and the second surface 12. The second surface 12 has a recess 121 in air communication with the limiting slot 15 arranged on the second surface 12 and a loading portion 122 in air communication with the recess 121 arranged on the second surface 12. The recess 121 has a pivotable shaft 1211 that protrudes from a portion thereof.

The camera module 2 is installed on the first surface 11 of the base 1 and positioned on a side thereof normal to the front end 13 and the back end 14. The camera module 2 can be arranged with a plurality of lenses therein and a voice coil motor (not shown in figures) for auto-focus. When the camera module 2 receives imaging, the voice coil motor adjusts the distance between the plurality of lenses in order to focus on the imaging received by the camera module 2.

The reflective mirror structure 3 includes a frame 31 and at least one mirror body 32. The frame 31 can be pivotally engaged to the first surface 11 of the base 1. The mirror body 32 is installed on the frame 31. The mirror body 32 installed on the frame 31 can rotate via the connection to the frame 31, and selectively correspond to the front end 13 or the back end 14, as a result, imaging can be correspondingly reflected to the camera module 2.

Specifically, the frame 31 has a hollowed out first receiving portion 311 formed thereon in the instant embodiment, one mirror body 32 is installed in the first receiving portion 311. Moreover, a bottom portion of the frame 31 has a guiding portion 312 arranged thereon. The guiding portion 312 has a groove arranged along a direction normal to the first receiving portion 311 and corresponding to the limiting slot 15 of the base 1. Please refer to another embodiment in FIG. 6, the guiding portion 312 can also be a guiding hook, but is not limited to the example provided herein.

The driver 4 is installed on the second surface 12 of the base 1 and connected the reflective mirror structure 3 in order to drive the rotational motion of the reflective mirror structure 3. In the instant embodiment, the driver 4 is a solenoid valve, but the driver 4 can also be a stepper motor as well as a DC motor, but is not limited to the example provided herein.

Specifically, the driver 4 is installed on the loading portion 122 of the base 1, in which the driver 4 can be coupled to or locked onto the loading portion 122. The driver 4 has a rotatable body 41 driven by electromagnetism. The rotatable body 41 has an axial bore 411 and a push rod 412 arranged thereon. The rotatable body 41 is correspondingly disposed in the recess 121 of the base 1. The pivotable shaft 1211 in the recess 121 passes through the axial bore 411, whereas the push rod 412 is inserted into the limiting slot 15 of the base 1 and passes through the guiding portion 312 of the bottom portion of the frame 31.

When the rotatable body 41 is rotated about the axial bore 411, the push rod 412 of the rotatable body 41 can pass through the base 1 via the limiting slot 15, and so the guiding portion 312 at the bottom portion of the frame 31 can drive rotational motions of the reflective mirror structure 3. The driver 4 drives the rotatable body 41 via electromagnetic induction, while the method to direct different directions of rotation is not further disclosed as it is considered as conventional art.

Figure 4A:
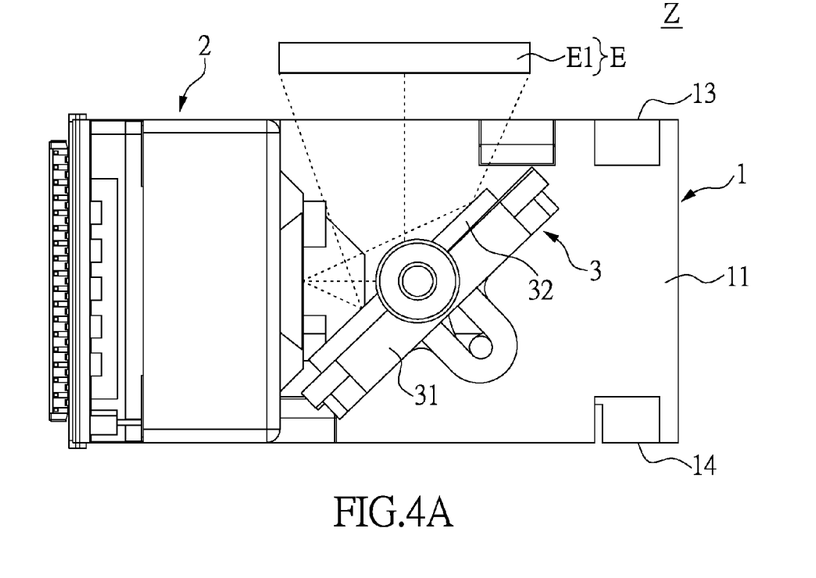
FIG. 4A is a schematic diagram illustrating actuations of the camera angle adjustable device in accordance with the first embodiment of the instant disclosure.

Please refer to FIG. 4A as a schematic diagram illustrating actuations of the camera angle adjustable device. When users prefer to engage in photography using the forward photographic window E1 of the portable electronic device E, the driver 4 rotates the reflective mirror structure 3 via software control. The mirror body 32 of the reflective mirror structure 3 rotates to face the forward photographic window E1 such that imaging received by the forward photographic window E1 is reflected towards the camera module 2.

Figure 4B:
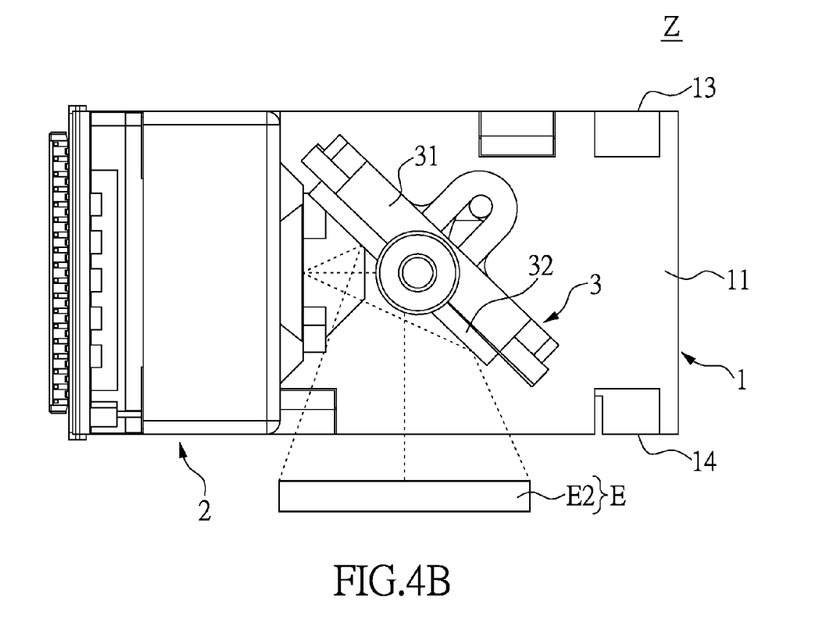
FIG. 4B is another schematic diagram illustrating actuations of the camera angle adjustable device in accordance with the first embodiment of the instant disclosure.

Please refer to FIG. 4B as another schematic diagram illustrating actuations of the camera angle adjustable device along with FIG. 1. When users prefer to engage in photography using the rearward photographic window E2, the driver 4 rotates the reflective mirror structure 3, such that the mirror body 32 of the reflective mirror structure 3 rotates to face the rearward photographic window E2, and imaging received by the rearward photographic window E2 is reflected towards the camera module 2. As a result, the camera angle adjustable device Z of the instant disclosure can provide forward and rearward shooting for a single lens camera module 2.

Notably, the mirror body 32 of the reflective mirror structure 3 and the corresponding photographic window (E1 or E2) are arranged with a 45 degree angle therebetween in order to completely reflect imaging from the forward and rearward photographic windows E1, E2. Moreover, the rotatable body 41 of the driver 4 can change from one photographic window to another through the rotation of the reflective mirror structure 3 by 90 degrees.

Second Embodiment

Figure 5:
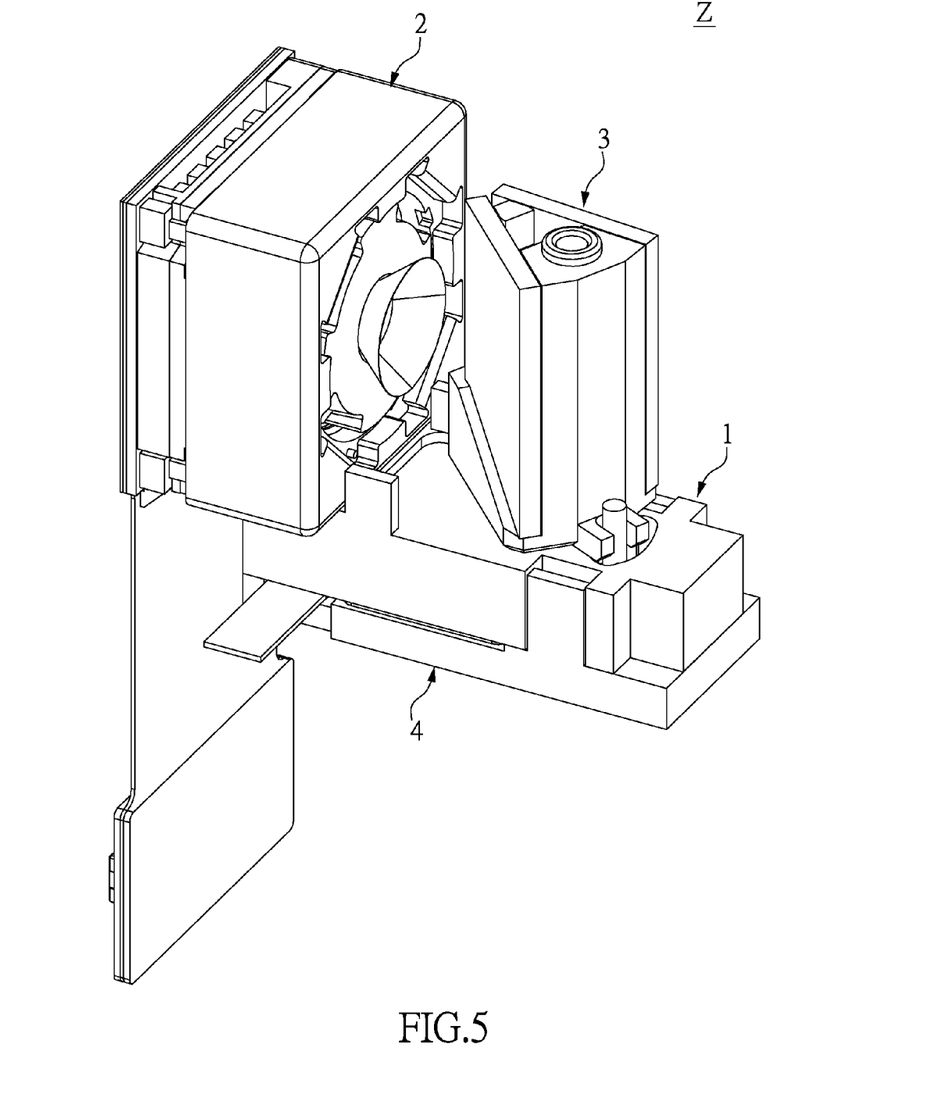
FIG. 5 is an assembled view of the camera angle adjustable device in accordance with a second embodiment of the instant disclosure.
Figure 6:
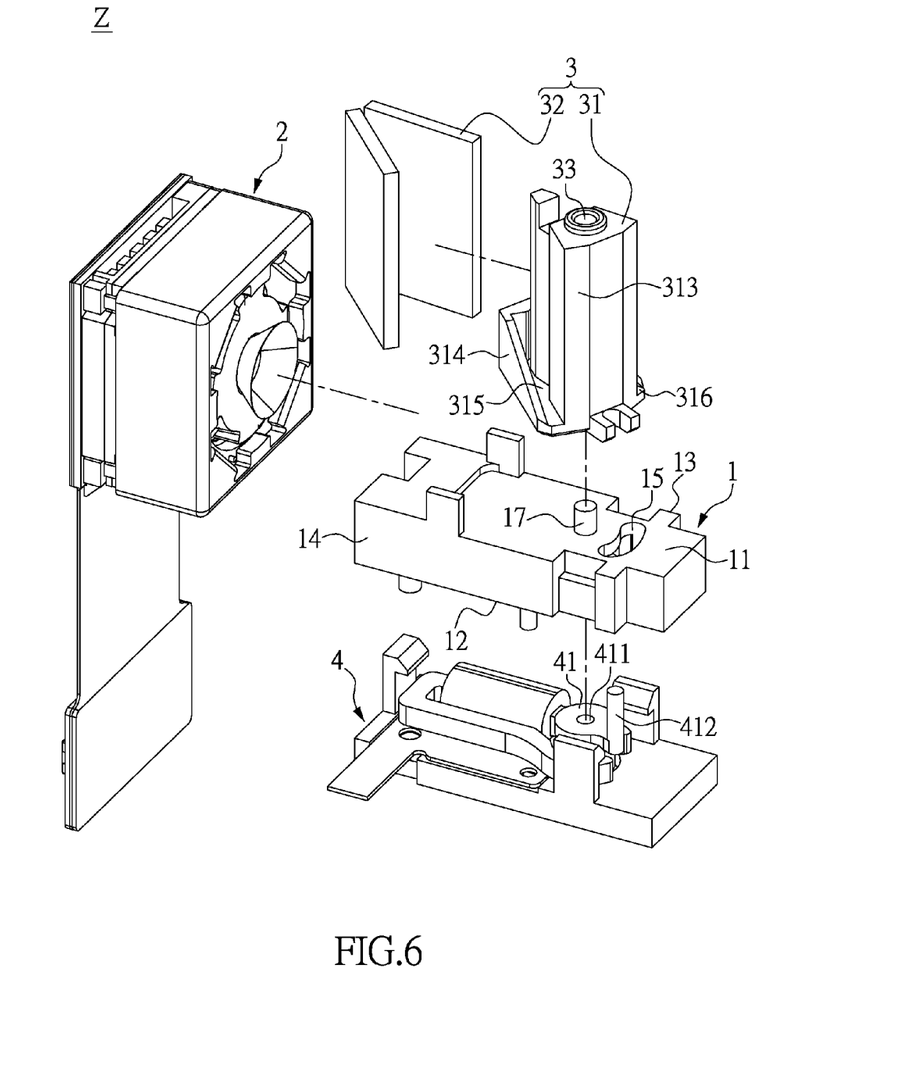
FIG. 6 is an exploded view of the camera angle adjustable device in accordance with the second embodiment of the instant disclosure.

Please refer to FIGS. 5 and 6. FIG. 5 is an assembled view of the camera angle adjustable device in accordance with a second embodiment of the instant disclosure, whereas FIG. 6 is an exploded view of the camera angle adjustable device in accordance with the second embodiment. The instant embodiment differs from the previous embodiment in that the frame 31 of the reflective mirror structure 3 includes a frame body 313 and a base seat 314, as well as two mirror bodies 32. The frame body 313 and the base seat 314 are connected to each other to define a second receiving portion 315 and a third receiving portion 316. The mirror bodies 32 are respectively inserted in the second and the third receiving portions 315, 316. Furthermore, the frame body 313 of the frame 31 resembles a triangular prism. When the mirror bodies 32 are assembled, an angle θ (as shown in FIG. 7A), an acute angle, exists between the mirror bodies 32 of less than 90 degrees.

Figure 7A:
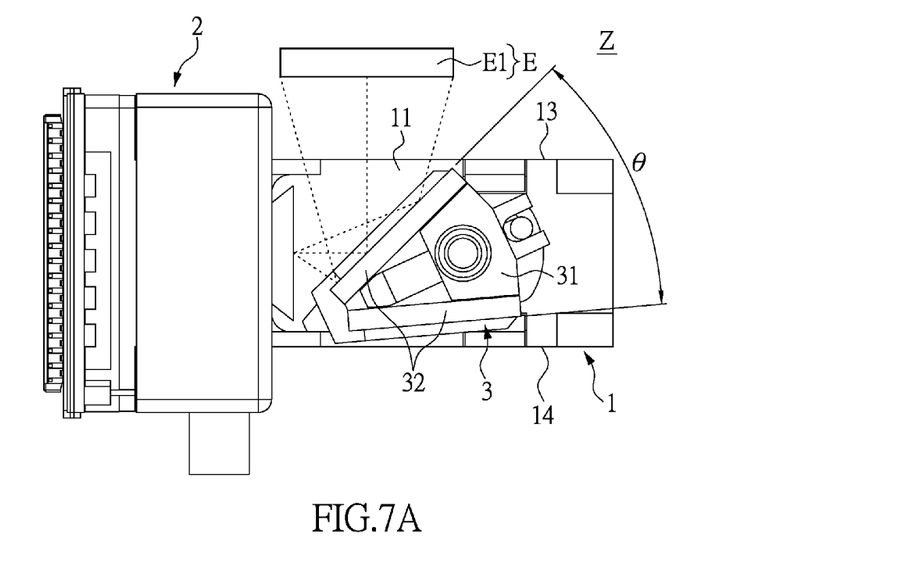
FIG. 7A is a schematic diagram illustrating actuations of the camera angle adjustable device in accordance with the second embodiment of the instant disclosure.

Please refer to FIG. 7A as a schematic diagram illustrating actuations of the camera angle adjustable device in accordance with the instant disclosure. When users prefer to engage in photography using the forward photographic window E1, the driver 4 rotates the reflective mirror structure 3 via software control. The mirror body 32 of the reflective mirror structure 3 rotates to face the forward photographic window E1 such that a 45 degree angle is set between the forward photographic window E1 and the mirror bodies 32, and imaging entering the forward photographic window E1 is completely reflected towards the camera module 2.

Figure 7B:
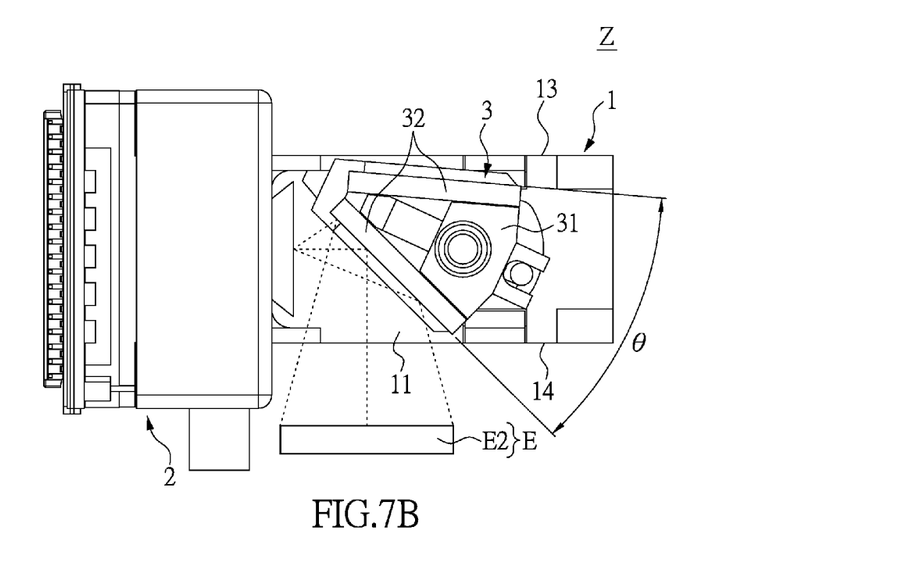
FIG. 7B is another schematic diagram illustrating actuations of the camera angle adjustable device in accordance with the second embodiment of the instant disclosure.

Please refer to FIG. 7B, as another schematic diagram illustrating actuations of the camera angle adjustable device in accordance with the instant disclosure, along with FIG. 5. When users prefer to engage in photography using the rearward photographic window E2, the driver 4 rotates the reflective mirror structure 3, such that a 45 degree angle is set between the rearward photographic window E2 and the mirror bodies 32 facing the rearward photographic window E2, and imaging entering the rearward photographic window E2 is completely reflected towards the camera module 2.

Notably, since an angle θ is set between two mirror bodies 32 installed on the frame 31 in the instant embodiment, only rotation of the two mirror bodies 32 having the angle θ therebetween is necessary for angle adjustment rather than rotating a 90 degree angle in order to achieve the same. In other words, the reflective mirror structure 3 of the instant embodiment can selectively adjust between the forward and rearward photographic windows E1, E2 by small angle adjustments, thus, relatively saving energy. Furthermore, since the rotational motion of the reflective mirror structure 3 is relatively short, the volume occupied by the camera angle adjustable device Z during rotation within the portable electronic device is relatively reduced, thus making the contemporary portable electronic device E even lighter.

Third Embodiment

Figure 8:
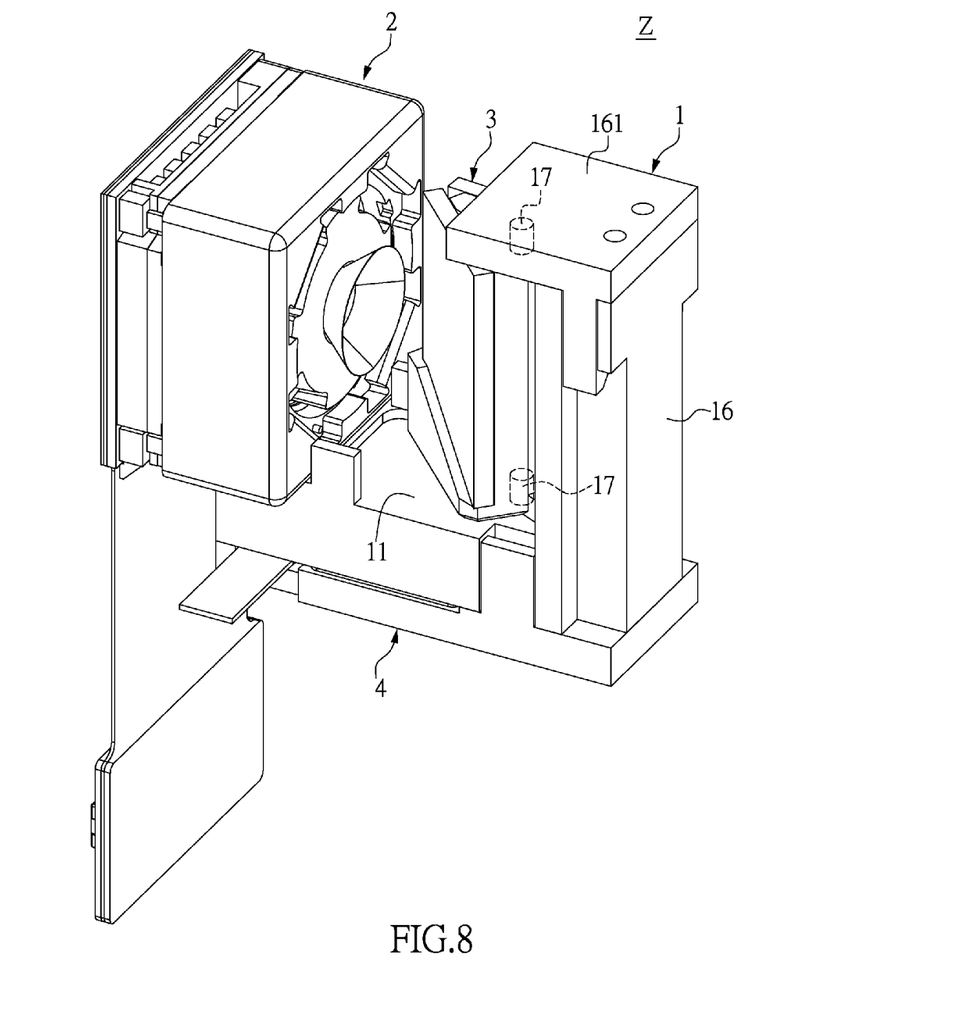
FIG. 8 is a partial exploded view of the camera angle adjustable device in accordance with a third embodiment of the instant disclosure.

Please refer to FIGS. 6 to 8. FIG. 8 is a partial exploded view of the camera angle adjustable device in accordance with a third embodiment of the instant disclosure. The instant embodiment differs from the previous embodiments in that the base 1 of the instant embodiment has an auxiliary wall surface 16 arranged thereon. The auxiliary wall surface 16 has a top portion. The top portion of the auxiliary wall surface 16 has a fixing base 161 arranged thereon. The auxiliary wall surface 16 is disposed on a side of the first surface 11 corresponding to the camera module 2. As a result, the auxiliary wall surface 16 can be used to assist rotation of the reflective mirror structure and prevent the reflective mirror structure 3 from excessive rotation. The fixing base 161 can fix the reflective mirror structure 3 from above.

More specifically, the first surface 11 and the fixing base 161 of the base 1 each have a first pivotable portion 17 arranged thereon. The frame 31 has an upper end and a lower end. The upper and lower ends each have a second pivotable portion 33 arranged thereon. The second pivotable portions 33 respectively correspond and are coupled to the first pivotable portions 17, so that the frame 31 is pivotally arranged between the first surface 11 of the base 1 and the fixing base 161. The first and second pivotable portions 17, 33 can be a complementary pair of pivotable axle and axial bore that are interchangeable, but are not limited thereto. As a result, when the driver 4 drives the rotational motion of the reflective mirror structure, the reflective mirror structure 3 can stably rotate about the first and the second pivotable portions.

Fourth Embodiment

Figure 9:
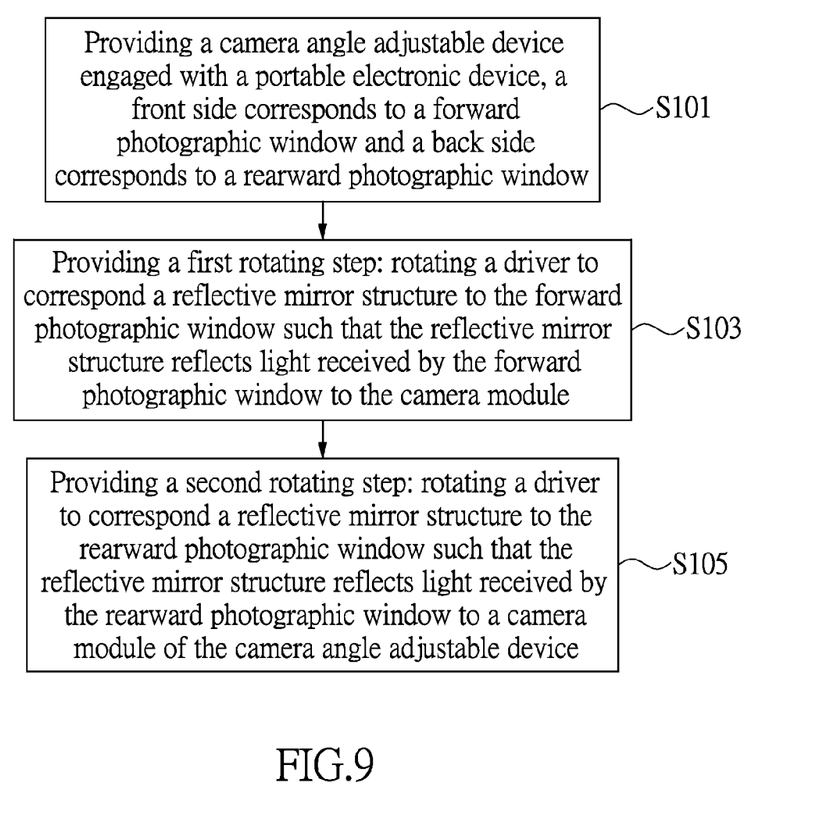
FIG. 9 is a flow diagram of a method for adjusting a camera angle in accordance with the instant disclosure.

Please refer to FIG. 9, a flow diagram accordance with the instant disclosure, along with FIGS. 1, 4A, and 4B. The instant disclosure also provides a method for camera angle adjustment for adjusting the camera angle of a portable electronic device E. The portable electronic device E has a forward photographic window E1, and rearward photographic window E2. The method including the steps as follows:

S101—Providing a camera angle adjustable device Z installed into a portable electronic device E, the front side 13 corresponds to the forward photographic window E1 and the back side 14 corresponds to the rearward photographic window E2;

S103—Providing a first rotating step: rotating the driver 4 to correspond the reflective mirror structure 3 to the forward photographic window E1, such that the reflective mirror structure 3 reflects light received by the forward photographic window E1 to the camera module 2; and S105—Providing a second rotating step: rotating the driver 4 to correspond the reflective mirror structure 3 to the rearward photographic window E2, such that the reflective mirror structure 3 reflects light received by the rearward photographic window E2 to the camera module 2.

Possible Effects of the Embodiments

In summary, a single lens camera module can capture images or video in front or behind the camera angle adjustable device in the first embodiment, without having to provide different camera modules and power supplies. The camera angle adjustable device of present disclosure reduces production costs and space, simplifies circuit and image processing software designs, and does not need to calibrate image quality of two camera modules having different resolutions, thus providing identical high resolution imaging quality in front of or behind the camera modules.

In the second embodiment, the frame of the reflective mirror structure has two mirror bodies arranged with an angle therebetween. The two mirror bodies can be separately arranged to face either the forward or rearward photographic windows, such that only a slight angle adjustment of the reflective mirror structure is required when adjusting the photographic windows. As a result, the camera angle adjustable device of the second embodiment can provide the same effects with a relatively smaller overall volume and thinner with respect to the camera angle adjustable device of the first embodiment. Moreover, the structure design of the camera angle adjustable device is also simplified.

The figures and descriptions supra set forth illustrate the preferred embodiments of the instant disclosure; however, the characteristics of the instant disclosure are by no means restricted thereto. All changes, alterations, combinations or modifications conveniently considered by those skilled in the art are deemed to be encompassed within the scope of the instant disclosure delineated by the following claims.

What is claimed is:

1. A camera angle adjustable device, comprising:
    a base having a first surface, a second surface, a front side, and a back side;
    a camera module disposed on a side of the first surface normal to the front side and the back side;
    a reflective mirror structure including a frame and two mirror bodies, the frame pivotally disposed on the first surface, the two mirror bodies arranged in the frame, wherein the two mirror bodies are angularly configured, one of the two mirror bodies selectively corresponds to the front side and another one of the two mirror bodies selectively corresponds to the back side by rotating the frame to reflect light from the front side or the back side toward the camera module; and
    a driver disposed on the second surface, the driver engaged to the frame to drive rotations of the reflective mirror structure.

2. The camera angle adjustable device as recited in claim 1, wherein the frame includes a frame body and a base seat connected to the frame, the frame and the base seat has two receiving portions arranged therebetween, the two mirror bodies are correspondingly configured to the two receiving portions.

3. The camera angle adjustable device as recited in claim 1, wherein the first surface of the base has an auxiliary wall surface arranged on another side of the first surface opposite to the camera module.

4. The camera angle adjustable device as recited in claim 3, wherein the auxiliary wall surface has a fixing base arranged on a side thereof opposite to the base, the frame is pivotally arranged between the first surface and the fixing base.

5. The camera angle adjustable device as recited in claim 4, wherein the first surface and the fixing seat each have a first pivoting portion arranged thereon, the frame has an upper portion and a lower portion, the upper and the lower portions each have a second pivoting portion correspondingly to the first pivoting portion, the two first pivoting portions and two second pivoting portions are respectively coupled such that the frame is pivotally arranged between the first surface and the fixing base.

6. The camera angle adjustable device as recited in claim 1, wherein the base has an arc shaped limiting slot arranged thereon and penetrating through the first and the second surfaces, the second surface has a recess in air communication with the limiting slot and a pivotable shaft protruding from a portion of the recess, the driver has a rotatably body driven by electromagnetism, the rotatable body has an axial bore and a push rod, the rotatably body is arranged in the recess, the pivotable shaft passes through the axial bore, and the push rod is inserted in the limiting slot.

7. The camera angle adjustable device as recited in claim 6, wherein a bottom portion of the frame has a guiding portion corresponding to the limiting slot, and the push rod passes through the guiding portion.

8. A method to adjust camera angle, for adjusting a camera angle of a portable electronic device, the portable electronic device having a forward photographic window and a rearward photographic window, comprising the steps:
    providing the camera angle adjustable device as recited in claim 1, wherein the camera angle adjustable device engages with the portable electronic device, the front side of the base of the camera angle adjustable device corresponds to the forward photographic window and the back side of the base of the camera angle adjustable device corresponds to the rearward photographic window;
    rotating the driver to correspond the one of the two mirror bodies of the reflective mirror structure to the forward photographic window such that the one of the two mirror bodies of the reflective mirror structure reflects light received by the forward photographic window to the camera module; and
    rotating the driver to correspond the another one of the two mirror bodies of the reflective mirror structure to the rearward photographic window such that the another one of the two mirror bodies of the reflective mirror structure reflects light received by the rearward photographic window to the camera module of the camera angle adjustable device.

\* \* \* \* \*